United States Patent [19]

DeColibus

[11] 4,177,081
[45] Dec. 4, 1979

[54] TITANIUM DIOXIDE PIGMENT SLURRIES TO IMPART HIGH GLOSS TO WATER-BASED ACRYLIC PAINT SYSTEMS

[75] Inventor: Raymond L. DeColibus, Camden, Tenn.

[73] Assignee: E. I. DuPont de Nemours and Company, Wilmington, Del.

[21] Appl. No.: 966,253

[22] Filed: Dec. 4, 1978

Related U.S. Application Data

[63] Continuation-in-part of Ser. No. 857,676, Dec. 5, 1977, abandoned, which is a continuation-in-part of Ser. No. 753,460, Dec. 22, 1976, abandoned.

[51] Int. Cl.$^2$ .............................................. C09C 1/36
[52] U.S. Cl. .............................. 106/300; 106/308 N; 106/308 S
[58] Field of Search ................ 106/300, 308 N, 308 S

[56] References Cited

U.S. PATENT DOCUMENTS

| 3,019,123 | 1/1962 | Boller et al. | 106/308 S |
| 3,506,466 | 4/1970 | Bramelamp et al. | 106/300 |
| 3,536,510 | 10/1970 | Allen et al. | 106/300 |
| 3,758,322 | 9/1973 | Roberts et al. | 106/300 |
| 3,772,046 | 11/1973 | Knapp et al. | 106/300 |

Primary Examiner—Winston A. Douglas
Assistant Examiner—J. V. Howard

[57] ABSTRACT

An aqueous slurry of from 60 to 80 percent titanium dioxide is prepared from titanium dioxide of uniform and small particle size. At least 80 percent by weight of pigment is incorporated into an aqueous system containing suitable dispersant which slurry is then reduced to the final slurry concentration with water.

5 Claims, No Drawings

TITANIUM DIOXIDE PIGMENT SLURRIES TO IMPART HIGH GLOSS TO WATER-BASED ACRYLIC PAINT SYSTEMS

CROSS REFERENCE TO RELATED APPLICATION

This application is a continuation-in-part of my application Ser. No. 857,676 filed Dec. 5, 1977 which in turn was a continuation-in-part of a application Ser. No. 753,460, filed Dec. 22, 1976, now both abandoned.

BACKGROUND OF THE INVENTION

The present invention relates to the preparation and composition of titanium dioxide in an aqueous slurry suitable for incorporation in water-based acrylic paint systems to impart high-gloss characteristics to the dried paint film.

In recent years substantial research has been undertaken to develop titanium dioxide slurries that were suitable for use in paper and water-based paint manufacture. The economics and ease of use of such slurries has been a substantial incentive for the development of titanium dioxide slurries.

Hall and Looby disclose in U.S. Pat. No. 3,702,773 that a stabilized titanium dioxide slurry of from 60 to 82 percent by weight of titanium dioxide for use in paper manufacturing could be prepared. Roberts and Rowland disclose in U.S. Pat. No. 3,758,322 that a process for producing slurries of from 60 to 80 percent titanium dioxide content can be prepared from a pigment slurry containing 20 percent solids. Daubenspeck and Jett disclose in U.S. Pat. No. 3,847,640 that a pigment slurry containing 60 to 65 percent titanium dioxide is adapted to be used in latex flat paint formulations.

This invention provides another step forward in the development of titanium dioxide slurries. This invention provides a slurry of very high solids content that can be used to prepare high gloss water-based acrylic paint formulations.

SUMMARY OF THE INVENTION

This invention provides an aqueous slurry of titanium dioxide which when dried from a water-based acrylic coating composition forms a high-gloss film, said aqueous slurry contains from 60 to 80 percent titanium dioxide, from 0.2 to 1 percent based upon the weight of titanium dioxide of a compound of the formula

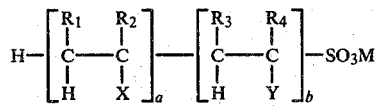

I.

where
M is alkali metal,
$R_1$ to $R_4$ is hydrogen, methyl or ethyl,
X is cyano or $-COOR_5$,
where $R_5$ is H, or lower alkyl of 1 to 4 carbon atoms,
Y is $-COOH$ or $-COONa$,
a and b are 10 to 100, and
from 0.1 to 0.6 percent based on the weight of titanium dioxide of 2-amino-2-methyl-1-propanol.

This invention also relates to a process for producing a high solids content titanium dioxide aqueous slurry which comprises preparing a solution of 0.2 to 1 percent of a compound of formula I and 0.1 to 0.6 percent of 2-amino-2-methyl-1-propanol, based on the weight of the titanium dioxide in about 10 to 25 percent of water, adding 75 to 90 percent by weight of titanium dioxide, grinding with a disc mill until uniform and adding sufficient water to reduce the titanium dioxide content to form 60 to 80 percent by weight of the finished slurry.

DESCRIPTION OF THE INVENTION

This invention relates to a high-solids, high-gloss aqueous composition of titanium dioxide which is commonly referred to in the art as a slurry. The slurries of this invention are high-solids slurries, i.e., from 60 to 80, and preferably from 70 to 80, percent by weight titanium dioxide. Most preferably, the solids content of the slurry will be from about 75 to 79 percent titanium dioxide. The compositions of this invention are also referred to as high-gloss slurries. The term "high-gloss slurry" means that when the slurry is incorporated into an acrylic paint formulation and dried into a thin film the film is of high gloss. The high-gloss slurries of this invention can be prepared simply from a dry titanium dioxide which has not been subjected to special surface treatments prior to incorporation into water. Outstanding gloss levels in acrylic water-based paint systems have been achieved when a chloride process titanium dioxide is simultaneously dried and ground using a fluid energy mill of the confined vortex type such as is taught in U.S. Pat. No. 3,840,188, the disclosure of said patent being herein incorporated by reference.

The titanium dioxide employed in the preparation of the slurry compositions of this invention will preferably be of uniformly small particle size with at least 95 mass percent of the average particle size being one micron or less and with an average particle size of less than about 0.6 microns.

The titanium dioxide will also be one which has no hydrous oxide after-treatment as the presence of hydrous oxide reduces the gloss of the finished paint film. It is understood, however, that the presence of rutilizing agents such as co-oxidized aluminum and the like which are normally present in titanium dioxide produced by oxidation of titanium tetrachloride will not obviate the advantages of the slurries of this invention.

To achieve the outstanding properties of gloss the slurry is prepared by adding dry titanium dioxide to about 13 to 20 percent by weight of water, preferably 13 to 15 percent by weight of water, which contains about 0.2 to 1 percent, based on the weight of titanium dioxide, of a compound of formula I and from 0.1 to 0.6 percent, based on the weight of titanium dioxide, of 2-amino-2-methyl-1-propanol. The high-solids slurry is then ground until uniform using a disc mill such as a Hockmeyer disperser manufactured by H. H. Hockmeyer, Inc. The grinding is continued until the slurry becomes uniform and then sufficient water is added to reduce the solids content of the slurry to from about 60 to 80 percent by weight.

When preparing the slurries of this invention the titanium dioxide content of the initial slurry should be at least 80 percent by weight so that the disc mill can impart sufficient shear into the system to assure reduction in agglomerate size of the titanium dioxide within the limits of this invention. Ideally the particle size will be as fine as possible with the average particle size of less than about 0.6 microns with not more than 5 mass percent of the titanium dioxide particles or agglomerates, as the case may be, with a particle size greater than one micron. Therefore, depending on the pigment base being employed the grinding time and pigment concentration will be adjusted to achieve the desired particle size uniformity and distribution. It has also been discovered that addition of about five percent water to the system after the grinding step results in improved rheological properties of the slurry and handling and use of the finished slurry is markedly enhanced.

It has also been discovered that the use of a suitable dispersant system is necessary to achieve a titanium dioxide slurry which imparts outstanding gloss to a paint film derived from a water-based system. The dispersant system comprised of 0.2 to 1 percent of a compound of formula I and from 0.1 to 0.6 percent of 2-amino-2-methyl-1-propanol, based on the weight of titanium dioxide present, will then combined with the other processing conditions described herein produce a titanium dioxide slurry with an unexpectedly high level of gloss in a dried paint film.

The following examples are illustrative of the invention. All parts and percentages are by weight unless otherwise noted.

EXAMPLE 1

Titanium dioxide produced by the oxidation of titanium tetrachloride and about 1.0 percent aluminum oxide in aqueous slurry of about 55-75 percent by weight solids is fed to a fluid energy mill as described in the example of U.S. Pat. No. 3,840,188 and dried and ground using a steam to pigment ratio of from 2.5 to 6 as described therein to produce dry titanium dioxide of uniform and small particle size.

EXAMPLE 2

To 5,300 ml of water in a five-gallon container is added 150 ml of a compound of formula I in which M is Na, $R_1$ to $R_4$ are hydrogen and X and Y are carboxyl groups, which compound is sold by Uniroyal Corporation as Polywet ND-2, and 60 ml of 2-amino-2-methyl propanol. To the above solution is added 30,000 g of titanium dioxide pigment obtained as described in Example 1. Then a Hockmeyer disperser fitted with a four-inch blade rotating at 4,000 rpm is employed to grind the pigment. After grinding for 20 minutes, 3,000 ml of water is added to reduce the solids concentration in the slurry to about 76.7 percent by weight. The particle size of the solids is determined using a Micrometrics 5000 Analyzer which shows a mass percent of particles finer than:

| Mass % | Size (μ)* |
|---|---|
| 84 | 0.65 |
| 50 | 0.47 |
| 16 | 0.325 |
| 3.5 | >1 |
| 33 | <0.4 |

*84 indicates that 84% of the particles are 0.65μ or smaller.

The slurry prepared in Example 2 is compared with a commercially available high-gloss titanium dioxide for gloss and hiding power as described below.

Air Dry Emulsion Gloss

An acrylic emulsion paint is prepared containing a 22.8 pigment volume concentration. The acrylic emulsion paint is drawn down to a film thickness of 0.008 inch and is allowed to dry for a minimum of three days and the gloss (60°) of the paint film is then determined.

Oven Dry Emulsion Gloss

An acrylic emulsion paint is prepared containing a 25 pigment volume concentration. The acrylic emulsion paint is drawn down to a film thickness of 0.004 inch and is immediately placed into a 110° C. draft free oven for thirty minutes and the gloss (60°) of the paint film is then determined.

Hiding Power

The above acrylic emulsion paint preparations are drawn down to a film thickness of 0.0025 inch on Morest 09 chart and dried for 24 hours. Hiding power of the paint prepared from the slurries of this invention is compared with that of the control. The relative hiding power (H.P.) of the slurries of this invention are calculated as follows:

$$H.P. = \frac{SX \text{ of Test Sample}}{SX \text{ of Control Sample}} \times 100$$

SX—Scattering power determined according to the method of D. B. Judd, "Optical Specifications of Light Scattering Materials," Journal of Research of the National Bureau of Standards, Vol. 19, 1937, p. 287.

| | Emulsion Gloss | | |
|---|---|---|---|
| | Air Dry | Oven Dry | H.P. |
| Slurry of Example 2 | 62 | 75 | 102 |
| Control | 49 | 56 | 100 |

EXAMPLE 3

2-Amino-2-methyl propanol (45 ml) and a compound of formula I in which M is Na, $R_1$ to $R_4$ are hydrogen and X and Y are carboxyl groups (114 ml), which compound is sold by Uniroyal Corporation as Polywet ND-2, are added to 7,200 ml of water in a five-gallon container. To this mixture is added 22,700 g of the titanium dioxide pigment prepared in accordance with Example 1. The resultant slurry is then ground with a Hockmeyer disperser fitted with a four-inch blade for 20 minutes at 1,500 rpm. After this grinding the solids content of the slurry is reduced with 2,500 ml of water to give a final slurry with a solids concentration of 68.2.

The emulsion gloss and hiding power of the slurry of Example 3 is compared with that of a commercial gloss pigment with the following results:

| | Emulsion Gloss | |
|---|---|---|
| | Air Dry | H.P. |
| Slurry of Example 3 | 64 | 99 |
| Control | 56 | 100 |

EXAMPLE 4

Sixty milliliters of 2-amino-2-methyl propanol and 240 ml of a compound of formula I in which M is Na, $R_1$ to $R_4$ are hydrogen and X and Y are carboxyl groups, which compound is sold by Uniroyal Corporation as Polywet ND-2, are added to 5,300 ml of water in a five-gallon container. To the above mixture is added 30,000 g of a titanium dioxide pigment obtained as described in Example 1. Then a Hochmeyer disperser fitted with a four-inch blade rotating at 2,000 rpm is employed to grind the pigment. After grinding for 20 minutes 3,500 ml of water is added to reduce the solids concentration in the slurry to about 77 percent by weight.

The particle size of the solids present in the slurry is determined using a Micrometrics 5000 Analyzer which shows a mass percent of particles finer than:

| Mass % | Size ($\mu$) |
|---|---|
| 84 | 0.51 |
| 50 | 0.375 |
| 16 | 0.245 |
| 2.0 | >1 |
| 58 | <0.4 |

The gloss and hiding power of the slurry of Example 4 is compared with that of a commerical gloss pigment as described above with the following results:

| | Emulsion Gloss Air Dry | H.P. |
|---|---|---|
| Slurry of Example 4 | 64 | 99 |
| Control | 49 | 100 |

The following examples are presented to demonstrate that the high-solids grind followed by dilution to a solids concentration within the range of 60 to 80 percent solids will produce a slurry which provides improved gloss when compared to the same pigment which is dried conventionally and incorporated directly into the paint system.

EXAMPLE 5

Fifty-four milliliters of 2-amino-2-methyl propanol and 185 ml of a compound of formula I in which M is Na, $R_1$ to $R_4$ are hydrogen and X and Y are carboxyl groups, which compound is sold by Uniroyal Corporation as Polywet Nd-2, are added to 2,930 ml of water. To the above mixture is added 18,000 g titanium dioxide pigment upon which has been precipitated 0.2 percent alumina. Then a Hockmeyer disperser fitted with a four-inch blade rotating at 2,000 rpm is employed to grind the pigment. After grinding for 20 minutes 1,800 ml of water is added to reduce the solids content of the slurry to 79 percent by weight.

The particle size of the solids is determined using a Micrometrics 5000 Analyzer which shows a mass percent of particles finer than:

| Mass % | Size ($\mu$) |
|---|---|
| 84 | 0.54 |
| 50 | 0.35 |
| 16 | 0.245 |
| 4.0 | >1 |
| 65 | <0.4 |

The air dried gloss and hiding power of the slurry of Example 5 is compared with that of a commercial gloss pigment as described above with the following results:

| | Emulsion Gloss Air Dry | H.P. |
|---|---|---|
| Slurry of Example 5 | 67/71* | 101 |
| Control | 60/49* | 100 |

*repeat of gloss test

EXAMPLE 6

Fifty-four milliliters of 2-amino-2-methyl propanol and 145 ml of a compound of formula I in which M is Na, $R_1$ to $R_4$ are hydrogen and X and Y are carboxyl groups, which compound is sold by Uniroyal Corporation as Polywet ND-2, are added to 3,200 ml of water. To the above mixture is added 18,000 g of titanium dioxide which has not been surface treated. Then a Hockmeyer disperser fitted with a four-inch blade rotating at 2,000 rpm is employed to grind the pigment. After grinding for 20 minutes 1,800 ml of water is added to reduce the solids content to 78.5 percent by weight.

The particle size of the solids in the slurry is determined using a Micrometrics 5000 Analyzer which shows a mass percent of particles finer than:

| Mass % | Size ($\mu$) |
|---|---|
| 84 | 0.43 |
| 50 | 0.31 |
| 16 | 0.225 |
| 2.0 | >1 |
| 80.0 | <0.4 |

The gloss, emulsion gloss and hiding power of the slurry of Example 6 is compared with a commercial gloss pigment as described above with the following results:

| | Emulsion Gloss Air Dry | Oven Dry | H.P. |
|---|---|---|---|
| Slurry of Example 6 | 66/73* | 73 | 97 |
| Control | 60/64* | 56 | 100 |

*repeat of gloss test

What is claimed is:

1. An aqueous slurry of titanium dioxide pigment to provide a high-gloss finish to paint films derived from acrylic water-based systems, said slurry containing from 60 to 80 percent titanium dioxide, from 0.2 to 1 percent of a compound selected from the formula $$H-\left[\begin{array}{cc} R_1 & R_2 \\ | & | \\ C-C \\ | & | \\ H & X \end{array}\right]_a \left[\begin{array}{cc} R_3 & R_4 \\ | & | \\ C-C \\ | & | \\ H & Y \end{array}\right]_b -SO_3M$$

where
M is alkali metal,
$R_1$ to $R_4$ is H, $-CH_3$ or $C_2H_5$,
X is $-CN$ or $-COOR_5$ where $R_5$ is hydrogen or lower alkyl of 1–4 carbon atoms,
Y is $-COOH$ or $-COONa$, and
a and b are 10 to 100,
from 0.1 to 0.6 percent of 2-amino-2-methyl-1-propanol and the remainder water.

2. An aqueous slurry of claim 1 which contains from 70 to 80 percent by weight of titanium dioxide.

3. An aqueous slurry of claim 1 which contains from 75 to 79 percent by weight titanium dioxide.

4. A process for producing high solids content titanium dioxide aqueous slurry which comprises preparing a solution of 0.2 to 1 percent of a compound of the formula

where
M is sodium;
$R_1$ to $R_4$ is H,
X is —COOH,
Y is —COOH or —COONa, and
a and b are 10 to 100,
from 0.1 to 0.6 percent 2-amino-2-methyl-1-propanol in from 10 to 20 percent of water, the percentages being based upon the weight of the titanium dioxide present, adding from 80 to 90 percent by weight of dry titanium dioxide, grinding with a disc mill until the titanium dioxide is uniformly dispersed and then adding sufficient water to reduce the titanium dioxide content to from 60 to 80 percent by weight of the finished slurry.

5. A process for producing high solids content titanium dioxide aqueous slurry which comprises
(a) drying and grinding titanium dioxide pigment prepared by the oxidation of titanium tetrachloride in a confined vortex fluid energy mill;
(b) preparing a solution of 0.2 to 1 percent, based on the weight of titanium dioxide, of a compound of the formula

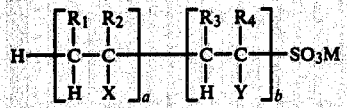

where
M is alkali metal,
$R_1$ to $R_4$ is H, —$CH_3$ or $C_2H_5$,
X is —CN or —$COOR_5$ where $R_5$ is H or alkyl of 1–4 carbon atoms,
Y is —COOH or —COONa, and
a and b are 10 to 100
and 0.1 to 0.6 percent, based on the weight of titanium dioxide, 2-amino-2-methyl-1-propanol in from 10 to 20 percent by weight of the slurry of water;
(c) adding from 80 to 90 percent by weight of the titanium dioxide of step (a) to form a slurry;
(d) grinding the slurry with a disc mill until the titanium dioxide is uniformly dispersed and is of an average particle size of less than about 0.6 micron with not more than five mass percent of the particles having an average particle size of greater than one micron;
(e) adding sufficient water to reduce the titanium dioxide content to from 75 to 79 percent by weight of the finished slurry; and
(f) mixing the slurry until smooth and uniform.

* * * * *